Figure 1:
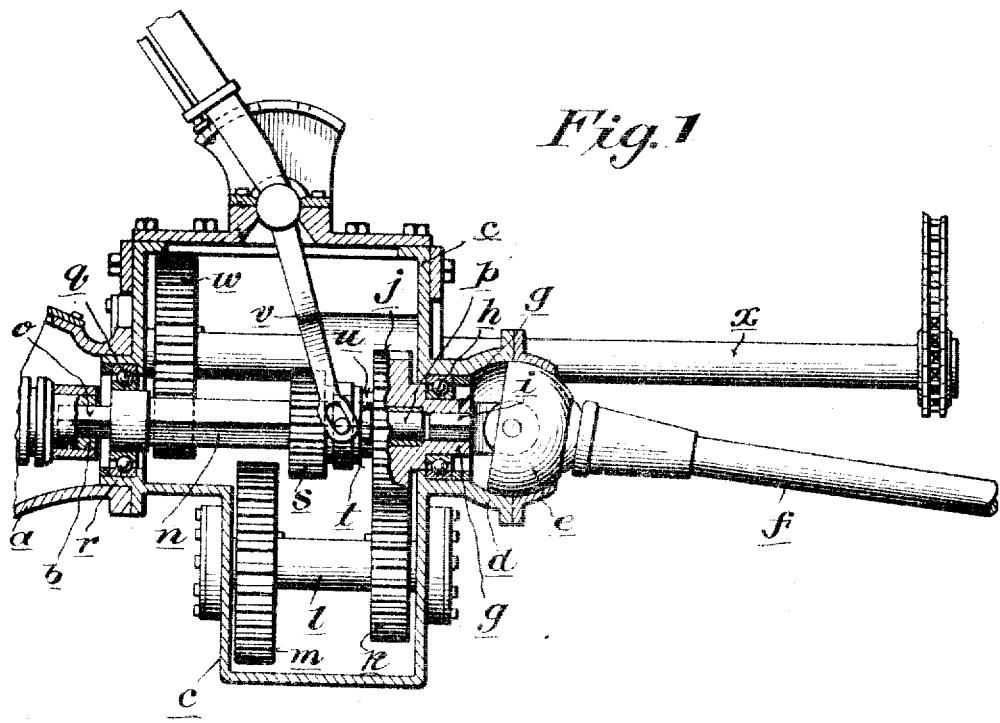

P. G. HOWE.
MOTOR VEHICLE GEARING.
APPLICATION FILED JAN. 2, 1918.

1,274,417. Patented Aug. 6, 1918.

Witness
Chas. L. Griesbauer

Inventor
Perley G. Howe
By Davis & Davis
Attorneys

UNITED STATES PATENT OFFICE.

PERLEY G. HOWE, OF ANDERSON, INDIANA.

MOTOR-VEHICLE GEARING.

1,274,417.

Specification of Letters Patent.

Patented Aug. 6, 1918.

Application filed January 2, 1918. Serial No. 209,915.

*To all whom it may concern:*

Be it known that I, PERLEY G. HOWE, a citizen of the United States of America, and a resident of Anderson, county of Madison, and State of Indiana, have invented certain new and useful Improvements in Motor-Vehicle Gearings, of which the following is a full and clear specification.

The object of this invention is to provide a simple supplemental gearing which may be applied to a motor vehicle of the shaft-driven type and be utilized not only as a low-speed drive for the vehicle, but also as a means for driving auxiliary machinery or apparatus, as more fully hereinafter set forth.

In the drawing—

Figure 2:
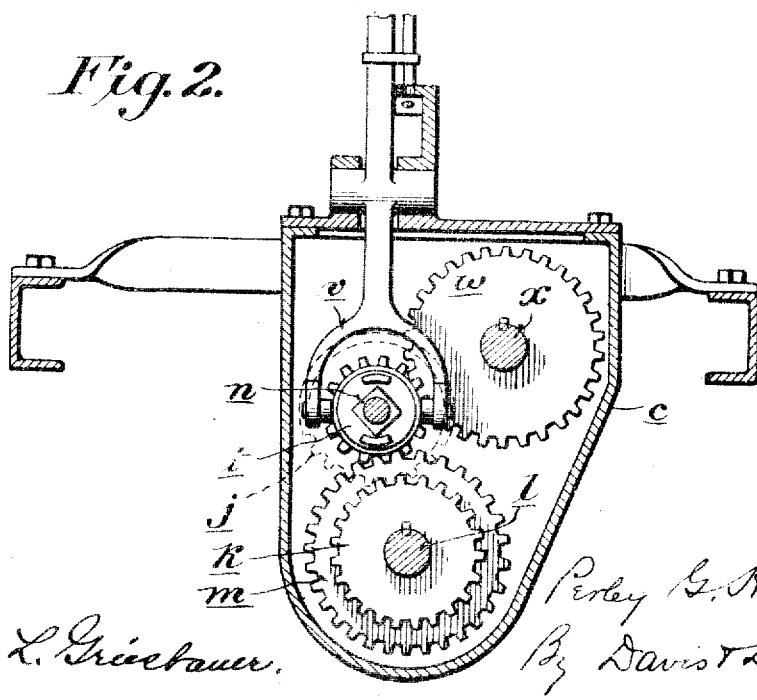

Figure 1 is a vertical sectional view of the preferred form of my gearing, showing it applied to a motor vehicle of the "Ford" type; and Fig. 2 is a vertical section taken at right angles to the line on which Fig. 1 is taken.

In the drawing, $a$ designates the rear end of the usual transmission case of the automobile motor for driving the vehicle and which contains variable speed driving mechanism of the usual type, the rear end of the main driven shaft of the transmission being illustrated at $b$ in the drawing, this rear end being, as usual, provided with a squared socket for connection with the usual propeller shaft of the vehicle.

Affixed to the rear end of the transmission case is a casing $c$, upon the rear wall of which is mounted the bearing $d$ of the usual universal joint $e$ of the propeller shaft $f$ of the vehicle. Connected to the inner or forward half of the universal joint is a short shaft $g$ which is journaled in a ball-bearing $h$ mounted on the rear wall of the casing $c$. This short shaft $g$ is provided with a squared socket in which fits the squared end $i$ of the forward end of the propeller shaft, and on the inner end of the short shaft $g$ is carried a gear $j$. This gear $j$ meshes at all times with a gear $k$ affixed to a horizontal countershaft $l$ which carries at its forward end another gear $m$.

Extending from the transmission shaft $b$ to the short shaft $g$ is an intermediate short shaft $n$, the forward end of this shaft $n$ being provided with a squared end $o$ which fits into the similarly shaped socket of the transmission shaft. The rear end $p$ of the shaft $n$ is journaled in an axial passage in the shaft $g$. At the forward end of the shaft $g$, it is supported on a ball-bearing $q$ mounted in the front wall of the casing $c$, this front wall being provided with a tubular extension $r$ which fits within the rear end of the transmission case $a$. Slidingly but non-rotatively mounted on shaft $n$ is a pinion $s$, on the rear face of which is a clutch member $t$ which is adapted to interlock with a clutch member $u$ fixed on the forward face of the gear $j$. The pinion is adapted to be shifted back and forth on the shaft $n$ by a fork $v$ carried by a suitable lever.

It will be observed that the intermediate shaft $n$ is adapted to be driven at variable speeds by means of the usual variable-speed mechanism in the transmission and that when the clutch members $t$ and $u$ are interlocked the propeller shaft of the vehicle will be driven in the usual manner and be subject to the usual variation in speed from the transmission mechanism. When the propeller shaft is thus driven, the gears $k$ and $m$ rotate idly, but, by disconnecting the clutch $t$—$u$ and meshing the gear $s$ with the gear $m$, it will be seen that the propeller shaft is driven through the gears $m$, $k$ and $j$ at a reduced speed, the reduction being determined by the ratio of the gears. In this way, a reduction in the vehicle-driving mechanism is obtained that is supplemental to the reduction that may be obtained by means of the transmission alone, and, when this supplemental reducing gearing is employed an important advantage is that the transmission may in many cases be run in high speed, thus materially increasing the efficiency of the vehicle drive, it being well known that, especially in the "Ford" type of vehicle, the efficiency of the motor plant is maintained at a higher degree while running on the high speed of the transmission.

By sliding the gear $s$ along the shaft $n$ to a point forward of the gear $m$ and out of mesh therewith, the gear $s'$ may be brought into mesh with a gear $w$ affixed to a supplemental shaft $x$ journaled in the casing $c$ and adapted to be utilized for driving any suitable appliance or mechanism other than the vehicle-wheel-driving devices, such, for instance, as a pump or other apparatus carried by the vehicle or mechanism located adjacent the vehicle. It will be seen that this auxiliary power shaft $x$ may be driven at varying speeds from the usual transmission of the vehicle, it being an essential characteristic of this invention to thus utilize the transmission to variably drive this shaft $x$.

The nature and scope of the invention having been thus indicated and its preferred embodiment having been specifically described, what is claimed as new is:

1. An auxiliary transmission mechanism adapted to be installed adjacent the transmission gearing of an automobile, comprising a short shaft adapted to be connected to the main driven-shaft of the transmission so as to be thereby variably driven from the transmission, a pinion slidably but non-rotatively mounted on said short shaft, means for clutching this short shaft to the propeller shaft of the vehicle, a gear on the forward end of said propeller shaft, and a counter-shaft provided with a pair of gears one of which meshes with the gear on the forward end of the propeller shaft and the other of which is adapted to mesh with the slidable pinion on the short shaft when said clutch is out, for the purpose set forth.

2. The mechanism recited in claim 1, an auxiliary power shaft being arranged parallel with said short shaft and being provided with a gear adapted to mesh with said pinion when it is moved beyond its companion gear on the counter-shaft, for the purpose set forth.

In testimony whereof I hereunto affix my signature.

PERLEY G. HOWE.